United States Patent [19]
Kinkead

[11] Patent Number: 5,462,485
[45] Date of Patent: Oct. 31, 1995

[54] CONTROLLING AIR QUALITY

[75] Inventor: Devon A. Kinkead, Cumberland, R.I.

[73] Assignee: Extraction Systems, Inc., Woonsocket, R.I.

[21] Appl. No.: 161,904

[22] Filed: Dec. 3, 1993

[51] Int. Cl.⁶ .................................................. F24F 11/04
[52] U.S. Cl. ........................................ 454/256; 454/902
[58] Field of Search ............................ 454/75, 239, 256, 454/902

[56] References Cited

U.S. PATENT DOCUMENTS

| | | |
|---|---|---|
| 3,753,656 | 8/1973 | Matson et al. . |
| 4,437,391 | 3/1984 | Eguchi et al. ............................. 454/75 |
| 4,558,636 | 12/1985 | Malmstrom et al. ................ 454/902 X |
| 4,642,296 | 2/1987 | Hubner ..................................... 436/138 |
| 5,030,423 | 7/1991 | Obee et al. ............................. 422/122 |
| 5,074,137 | 12/1991 | Harris et al. ........................... 73/31.02 |
| 5,320,577 | 6/1994 | Tooru et al. ............................... 454/75 |

FOREIGN PATENT DOCUMENTS

| | | | |
|---|---|---|---|
| 2743107 | 4/1979 | Germany ................................ 454/256 |
| 134240 | 10/1980 | Japan ..................................... 454/256 |
| 73023 | 4/1987 | Japan ..................................... 454/256 |
| 203139 | 8/1990 | Japan ..................................... 454/256 |

Primary Examiner—Harold Joyce
Attorney, Agent, or Firm—Fish & Richardson

[57] ABSTRACT

Controlling quantity of outside air drawn into a building being based upon the rate of change in the concentration of pollutants in the air, whereby the quality of air inside the building is substantially controlled. An air system includes an intake port for coupling the air system to a source of outside air, a sensor located proximal to the intake port for monitoring the quality of the air, a regulator for controlling the quantity of air drawn into the building, and a controller coupled to the sensor and the regulator for directing the regulator to reduce the quantity of air drawn into the building in response to the rate of change of the concentration of the pollutants. Also, substantially controlling the quality of air inside a building by controlling the quantity of outside air drawn into a building based upon the concentration of carbon dioxide in the outside air.

16 Claims, 5 Drawing Sheets

CONTROLLING AIR QUALITY

BACKGROUND

This invention relates to schemes for controlling the quality of air inside buildings.

A great many buildings have their air intake systems located proximal to pollution sources such as emergency generators, delivery truck loading docks, helicopters, buses and aircraft. The quality of the outside air delivered to buildings can be compromised by the presence of these combustion sources.

Excursions in the air quality delivered to a building can have an adverse effect on its occupants. The presence of diesel, or other fossil fuel, combustion by-products can cause fairly serious physiological symptoms including watery eyes, irritation of mucous membranes, irritation of respiratory tracts, and drowsiness. One of the constituents of diesel exhaust is formaldehyde which has long been recognized as a pollutant that can adversely effect human health.

Sorbent-based filters utilize adsorbent particles (e.g., activated charcoal) impregnated with some sort of chemical (e.g., potassium permanganate, or some other oxidant, or amine), have been employed to control the concentrations of combustion by-products in air drawn into a building. Typically these filters consist of sorbent that is contained in either a media structure or a tray system. These filters are mounted in the air handling system of a building to remove gas-phase pollutants by means of adsorption/condensation and chemisorption. Typically, these filters are quite expensive relative to air filters normally employed in building air systems.

SUMMARY

In general, in one aspect, the invention features a scheme for controlling the quantity of outside air drawn into a building based upon the rate of change in the concentration of pollutants in the air, thereby substantially controlling the quantity of air inside the building.

Making comparisons based upon changes in the concentration of outside pollutants avoids the required frequent recalibration of the sensor associated with absolute concentration monitoring schemes. The recalibration of the sensor is necessary because there are fluctuations in outside air conditions (e.g., temperature and relative humidity), and there are also inherent drifts in the sensitivity of the sensor output over time that make the quality of the absolute value output of the sensor highly questionable.

A building air system according to the invention includes an intake port for coupling the air system to a source of air, a sensor located proximal to the intake port for monitoring the concentration of pollutants in the air, a regulator for controlling the quantity of air drawn into the building, and a controller coupled to the sensor and the regulator for directing the regulator to reduce the quantity of air drawn into the building in response to the rate of change of the concentration of pollutants in the air.

Embodiments of the invention include the following features. The sensor monitors the quality of the air by preferably sensing the concentration of pollutants comprising fossil fuel combustion by-products in the air (e.g., carbon dioxide, carbon monoxide, and nitrogen oxides ($NO_x$)). The regulator preferably comprises a damper for controlling the quantity of air drawn into the building by selectively blocking the air from being drawn through the intake port.

The controller preferably responds to changes in the concentrations of either carbon dioxide or nitrogen oxides ($NO_x$) in the air, or to changes in the concentration ratio of carbon monoxide to carbon dioxide in the air (or alternatively, the concentration ratio of carbon dioxide to carbon monoxide).

The controller triggers the reduction of air drawn into the building by modulating the damper to selectively block the influx of air drawn into the building when the rate at which the pollutant concentration in the outside air changes is above a predetermined threshold.

In another aspect, the invention features an air system that includes a controller that responds when the concentration of carbon dioxide in the outside air is above a predetermined threshold.

Irrespective of the completeness of oxidation of carbon-containing fuels inside combustion sources, it has been discovered by the inventors that the concentration of $CO_2$ in the ambient air provides a fairly good indication of the concentration of other airborne pollutants resulting from fossil fuel combustion (e.g., carbon monoxide, formaldehyde, nitrogen oxides and sulfur oxides). This is due, in part, to the fact that $CO_2$ concentrations in the atmosphere are 100 to 1,000 times that of any other combustion by-product.

The service life of gas-phase chemical air filters is inversely proportional to the concentration of pollutants in the air streams flowing through the filter. For example, a sorbent-based filter that filters air streams with a pollutant concentration of 20,000 parts per million at its inlet will have a very short life span relative to a filter that sees 1 part per billion at its inlet. Given the fact that it is time consuming and expensive to maintain sorbent-based filters, it is advantageous to increase their service life by reducing the concentration of pollutants passing through the filters.

The occupants in a building are protected from high levels of combustion-based pollutants invading the building through the outside air intake system by utilizing a sensor system that stands sentinel outside of the air intake for the building and detects excursions in the of pollutants in the outside air. By detecting departures from the normal concentrations of pollutant compounds in ambient air, the position of the intake dampers may be closed during periods of unacceptable air quality, reducing the total amount of pollutant that finds its way to the occupants' breathing Zone.

In the fall and the spring, in most climates, the outside air is at a temperature of about 55° F. and may replace (using an economizer cycle) conditioned air. An economizer cycle saves the costs associated with cooling building air. Therefore, it is economically important to shut off the supply of outside air only during those periods when the pollutant levels in the air pose a potential hazard to the occupants of the building.

Additionally, because the quantity of outside air delivered to a building is reduced only when necessary, the concentration of carbon dioxide, given off by the occupants of the building, may be maintained at a sufficiently low level that the occupants will not suffer drowsiness or other physiological systems associated with high carbon dioxide levels.

DESCRIPTION

Figure 1:
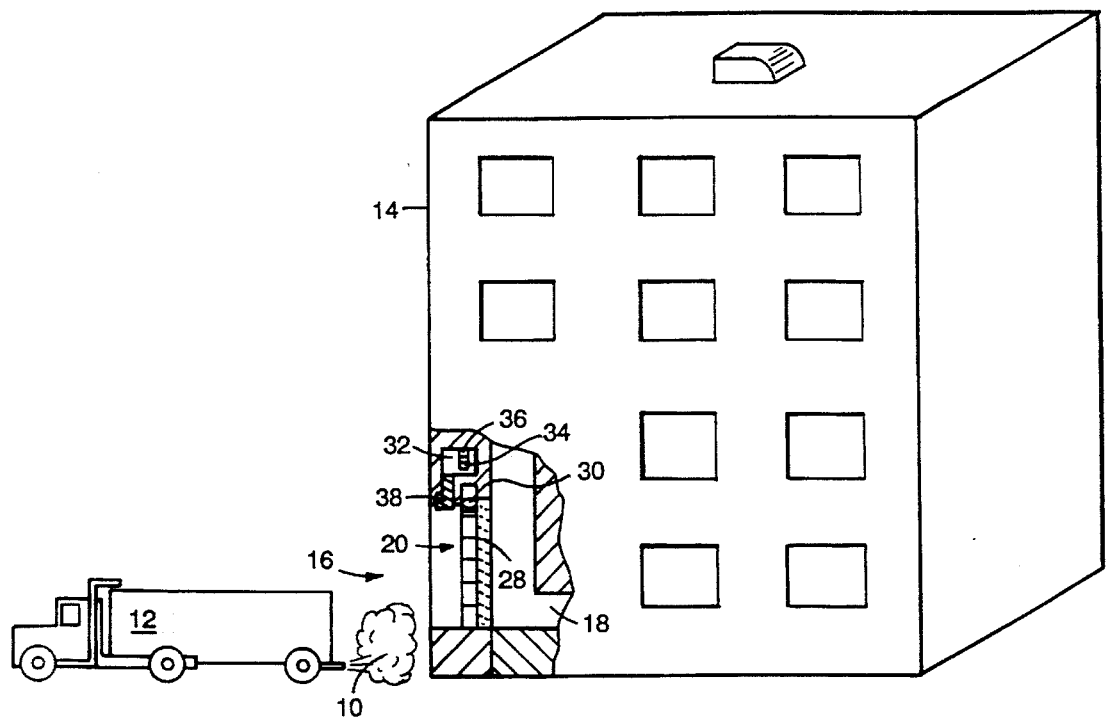
FIG. 1 is a perspective view, partially broken away, of a building with an air handling system, and a truck idling proximal to the building.

Referring to FIG. 1, pollutants 10 (e.g., diesel fuel combustion by-products) are discharged from the exhaust system of a delivery truck 12 that is idling while items are being transferred from the truck to a building 14. The truck is parked proximal to an air intake port 16 of the building's air system. The air system comprises air blowers that draw outside air into the building, and a network of air ducts 18 for circulating the air throughout the building.

Figure 2:
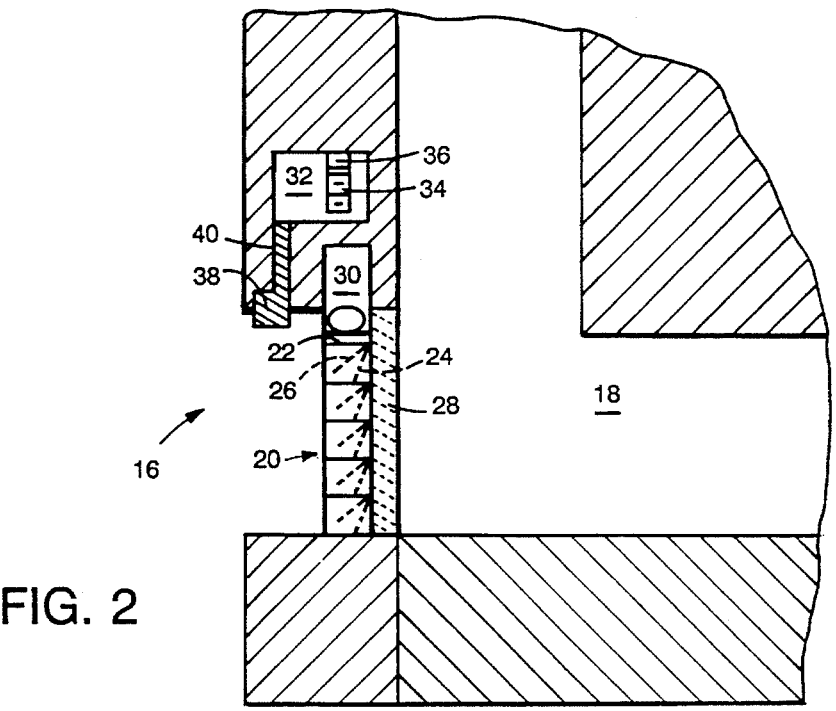
FIG. 2 is an expanded view of the air handling system shown in FIG. 1.

As shown in FIG. 2, located at the intake port 16 is a damper 20 that can be maintained in an open position 22, a closed position 24, or an intermediate position 26. When the damper is in the closed position 24, it substantially blocks the flow of air through the intake port 16, thereby preventing pollutants 10 from being drawn into building 14. A sorbent-based filter 28 (e.g., a Vaporsorb® chemical filter available from Extraction Systems, Inc. of Woonsocket, R.I., U.S.A.) is employed to substantially remove pollutants 10 from the air flowing past damper 20.

The position of damper 20 is maintained by a conventional pneumatic-electrical damper modulator 30 that is connected to a programmable controller 32 (e.g., a PIC 16C71 RISC-based microcontroller available from Microchip Technologies, of Arizona, N. Mex., U.S.A.) that has a memory buffer 34 and a timer 36. The controller regulates the influx of air through intake port 16 by directing modulator 30 to position damper 20 to be in an open, closed, or any intermediate position depending upon the concentration of pollutants in the outside air. Controller 32 samples the output of a sensor 38 (e.g., a Telaire 2001V $CO_2$ sensor, available from Telaire Corp. of Goleta, Calif. U.S.A.) over connection line 40.

Figure 3:
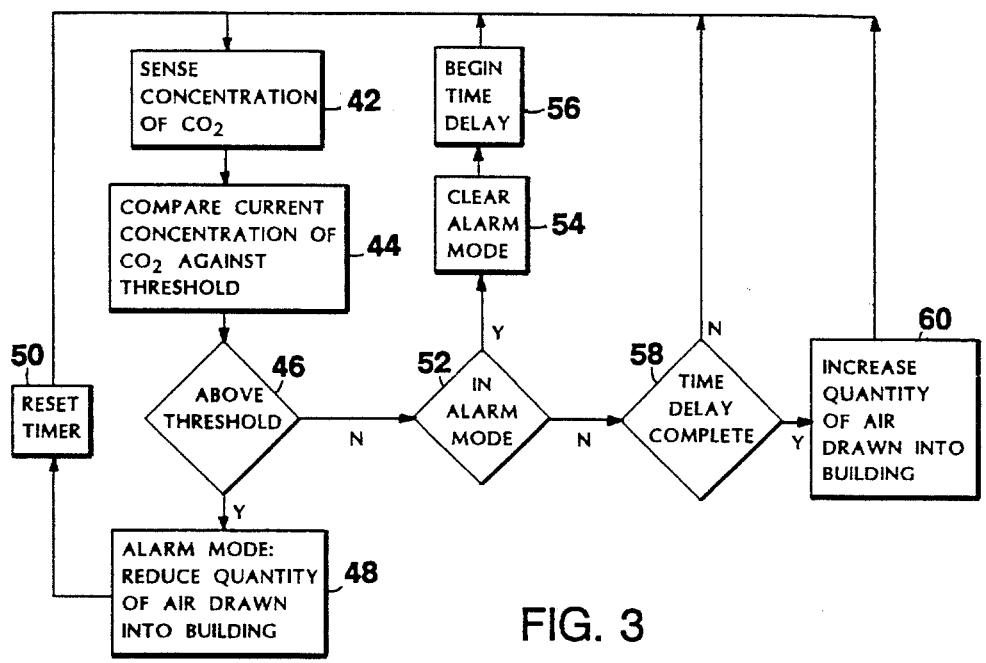
FIG. 3 is a flow diagram illustrating a sequence of steps for regulating the quality of outside air drawn into a building air system according to one aspect of the invention.

In one embodiment, as shown in FIG. 3, the air handling system controls the quality of air entering building 14 by executing the following sequence of steps.

Controller 32 samples the output of sensor 38, which indicates the concentration of carbon dioxide in the air proximal to the intake port 16 (42). The concentration of carbon dioxide is used as a surrogate parameter to indicate the concentration of other carbon-based pollutants in the air (e.g., formaldehyde).

The rate at which the controller samples the sensor output is adjustable by varying a potentiometer in the controller, although a preferred fixed sample rate is about once every four to ten seconds. The threshold value can also be adjusted by varying a potentiometer in controller 32.

The controller compares the current concentration of carbon dioxide against a predetermined threshold concentration (44). If the current concentration of carbon dioxide is above the predetermined threshold (46), the controller enters into alarm mode and directs modulator 30 to position damper 20 to be in a substantially closed position to reduce the quantity of pollutant-containing air drawn into building 14 (48). Timer 36 is also reset (50).

The controller 32, remains in alarm mode and maintains the damper in a substantially closed position until the concentration of carbon dioxide drops below the predetermined threshold value, at which point controller 32 clears the alarm mode and executes a time delay of e.g., about three and a half minutes with timer 36 (52–56).

After the time delay (58), the controller directs the modulator to open the damper to increase the quantity of air drawn into the building (60).

However, if, during the time delay, the current concentration of carbon dioxide rises above the threshold value (46), a new alarm cycle is executed and the timer is reset (50).

Figure 4:
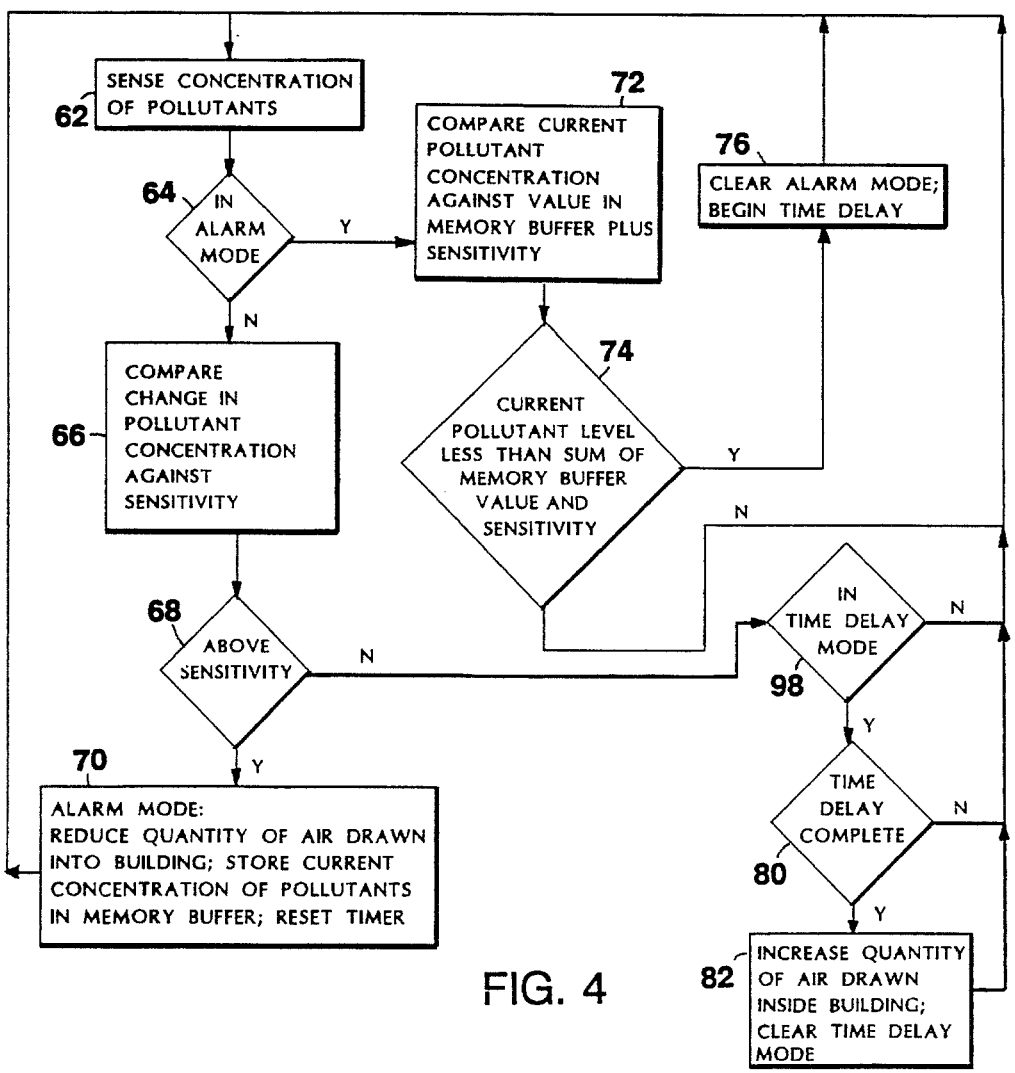
FIG. 4 is a flow diagram illustrating a sequence of steps for regulating the quality of air drawn into a building air system according to a preferred aspect of the invention.

In a preferred alternative embodiment shown in FIG. 4, rather than comparing the absolute concentration of pollutants against an absolute standard, changes in the concentration of pollutants over time can be compared to a threshold rate of concentration change (66), referred to as the sensitivity, and measured in parts per million (ppm) of pollutants.

In this scheme, controller 32 samples the output of sensor 38 (62). The sample rate is variable, although a preferred sample rate is about once every four to ten seconds. If the excursion in the pollutant concentration between samples is greater than the sensitivity (66), the controller enters into an alarm mode, and directs the modulator to substantially close damper 18 (70); the timer is also reset. The current value of the pollutant concentration is stored in memory buffer 34 of the controller.

The alarm mode is cleared (76) when the sampled sensor output falls below the sum of the value stored in buffer 34 and the sensitivity, at which point controller 32 executes a time delay of e.g., about three and a half minutes with timer 36.

If, during the time delay, the excursion in the concentration of pollutants is greater than the sensitivity (66), the controller once again enters into alarm mode and a new alarm cycle begins (70).

After the time delay (80), the quantity of air drawn into the building is increased by opening damper 20 (82).

In a preferred embodiment of the invention, sensor 38 is a carbon dioxide sensor (e.g., Telaire 2001V $CO_2$ sensor) that sends a signal to the controller indicating the concentration of $CO_2$ in the air proximal to the intake port 16.

Figure 5:
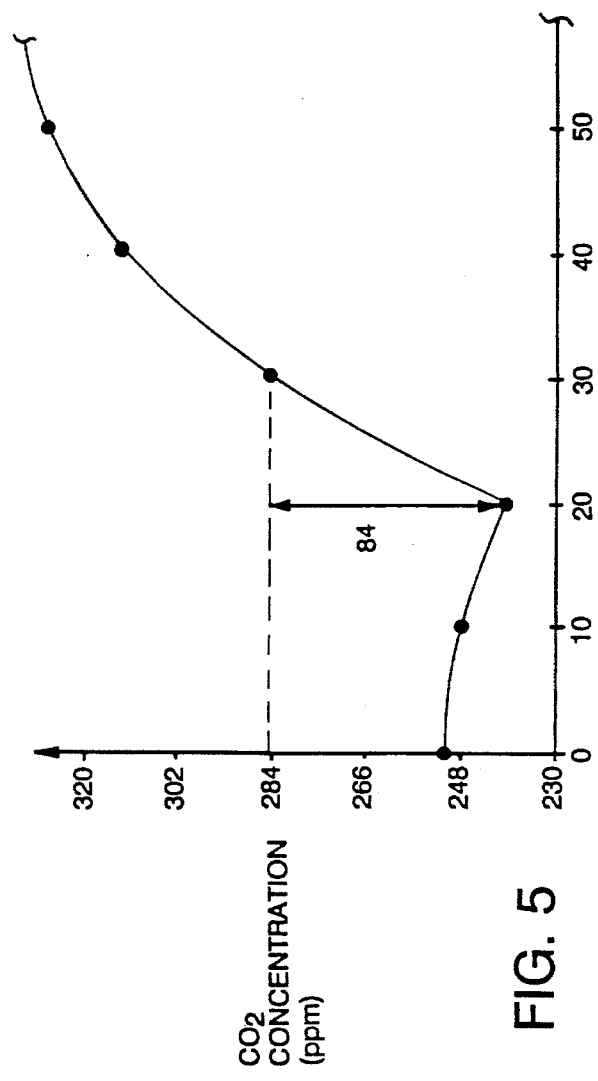
FIG. 5 shows a plot of the concentration of carbon dioxide over time in air outside of the air intake port of the building of FIG. 1.
Figure 5A:
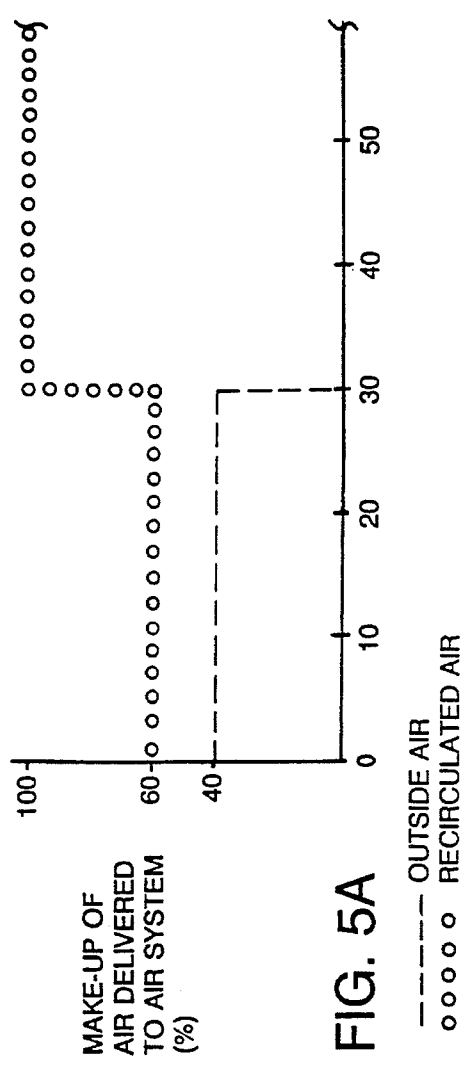
FIG. 5A shows the percentages of make-up air and recirculated air, over the time interval of FIG. 5, inside the building of FIG. 1 that has an air system according to a preferred aspect of the invention.

FIG. 5 shows the carbon dioxide concentration proximal to the intake port 16 over a period of time as recorded by sensor 38. FIG. 5A shows a plot of the percentages of outside air and recirculated air, over the same period of time as FIG. 5, inside building 14.

Between the times of zero and two seconds the concentration of $CO_2$ is at about 248 ppm, and the air inside the building includes 40% outside air and 60% recirculated air, as shown in FIG. 5A.

At a time of about two seconds delivery truck 12 has parked and remains idling near the intake port 16. Accordingly, as shown in FIG. 5, after a time of two seconds the $CO_2$ concentration monitored by sensor 38 begins to increase.

Controller 32 samples the output of the sensor once every ten seconds. When the controller compares increase 84 in the $CO_2$ concentration from twenty seconds (239 ppm) to thirty seconds (285 ppm) of 46 ppm against the sensitivity (predetermined at 35 ppm), the controller enters into alarm mode and directs the modulator to substantially close damper 20. The concentration value of 239 ppm is stored in the memory buffer 29 of the controller (steps 62 through 70 of FIG. 4). At this point the percentage of outside air drawn into the building drops to zero, while the percentage of recirculated air rises to 100%, as shown in FIG. 5A.

After about ten minutes the delivery truck 12 drives away from intake port 16. At a time of 610 seconds the concentration of $CO_2$ has dropped to 286 ppm, which is still greater than the sum of the value inside the memory buffer of 239 ppm and the value of the sensitivity (35 ppm), therefore the controller still does not leave alarm mode (steps 62–64 and 72–74 of FIG. 4). However, at a time of 620 seconds the $CO_2$ concentration has dropped to 272 ppm which is below 274 ppm (the sum of the value in the memory buffer and the sensitivity), hence the controller executes a time delay of about three and a half minutes (76), after which the quantity of outside air drawn into the building is increased, as shown in FIG. 5A (steps 62–68 and 78–82 of FIG. 4).

Figure 6:
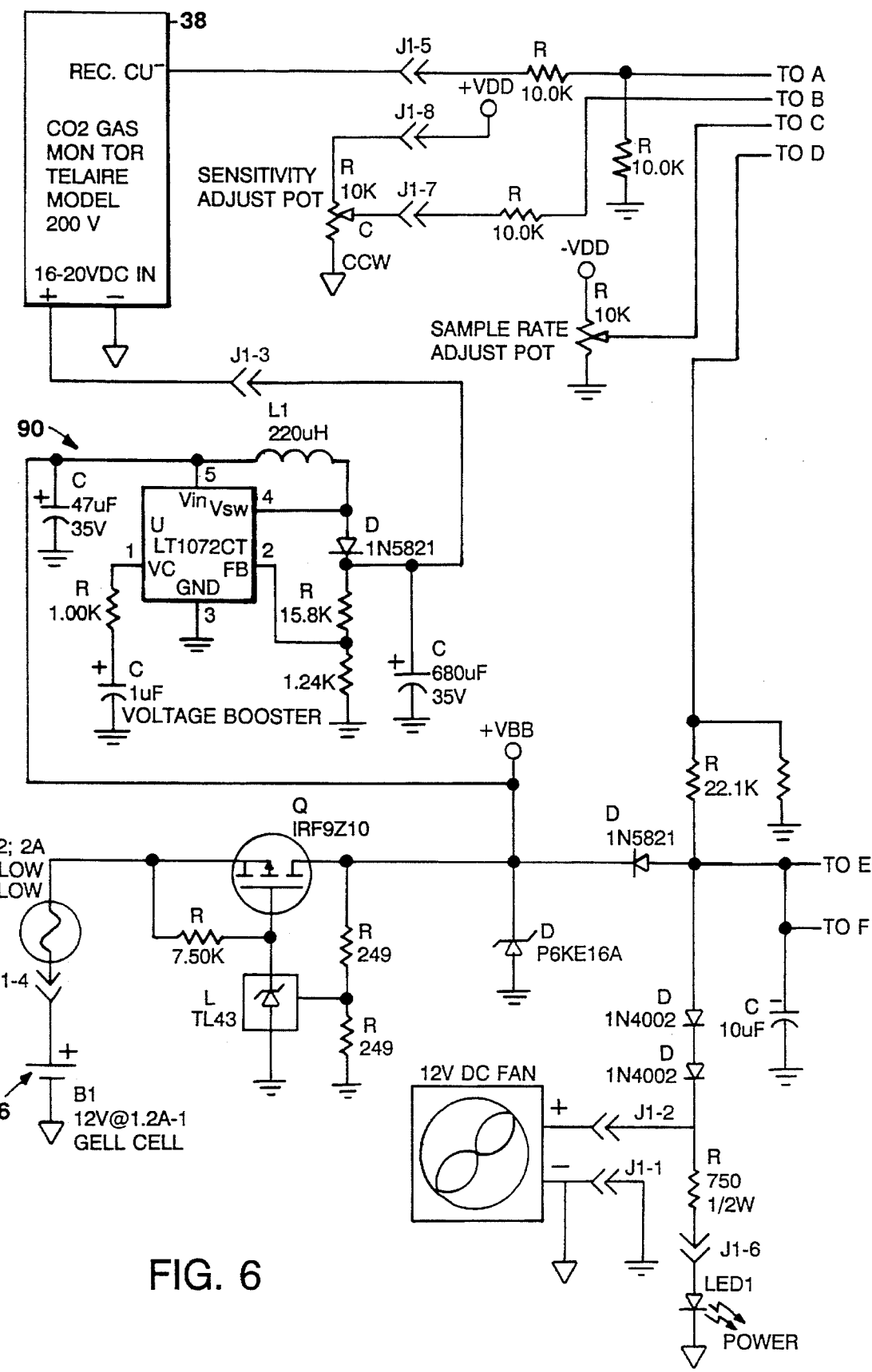
FIGS. 6 and 6A are schematic diagrams of a circuit for implementing the algorithm shown in FIG. 4.
Figure 6A:
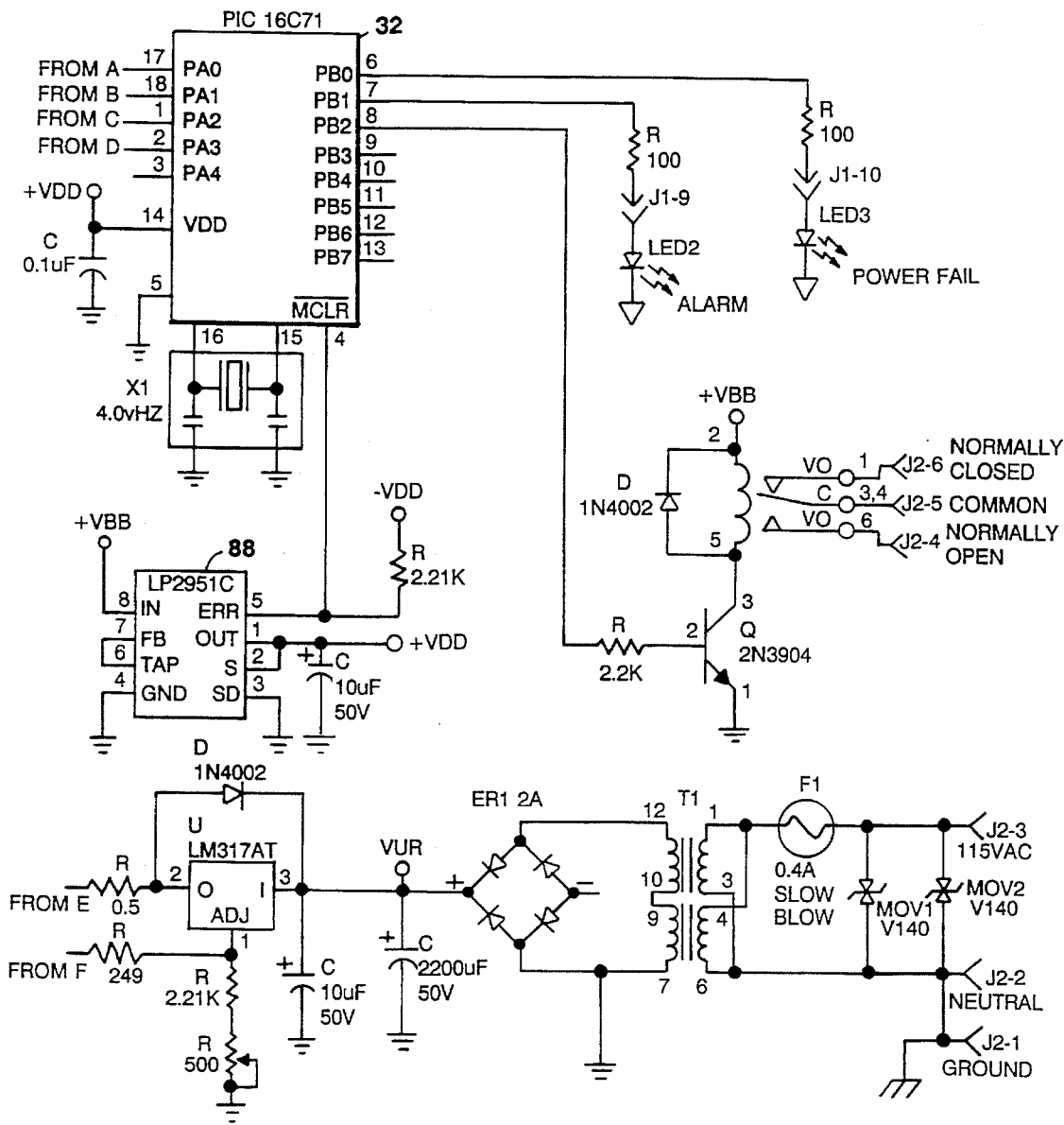

FIGS. 6 and 6A illustrate provides a possible implementation of the algorithm shown in FIG. 4.

Controller 32 (e.g., a PIC 16C71 RISC-based microcontroller) includes an analog-to-digital (A/D) converter that converts the output of sensor 38 to digital values with a resolution of about 0.05% (i.e., 8 bits, or 1 part in 256). Sensor 38 has a range of 5,000 ppm, thus, the A/D converter resolves the sensor output to about 20 parts per million (ppm).

Controller 32 also includes a watch dog timer to insure correct software execution in the event of extreme radio frequency or electromagnetic interference. A brownout protection circuit 86 prevents the circuit from operating if the power supply or battery voltage is too low for correct operation.

The controller further includes a battery backup system 88, including a 12 volt sealed, lead acid gel cell that is charged by the main power supply, that powers sensor 38 for at least two hours in the event primary power to the sensor fails. A voltage booster circuit 90 provides the correct voltage and amperage requires by sensor 38.

Other embodiments are within the scope of the claims.

For example, rather than using a damper to reduce the quantity of air drawn into the building, the controller may regulate the electric blowers of the building's outside air system. When the output of the sensor indicates that air quality is poor proximal to the intake port, the controller responds by reducing the rate at which the blowers draw outside air into the building.

Instead of monitoring the concentration of carbon dioxide in the air, the concentration ratio of carbon monoxide to carbon dioxide, or alternatively the concentration of nitrogen oxides ($NO_x$) can be monitored, and used as surrogate parameters to indicate the concentration of pollutants in the air.

What is claimed is:

1. An air system for substantially controlling the quality of air inside a building by controlling the quantity of outside air drawn into the building, said air system comprising an intake port for coupling said air system to a source of said air, said air being drawn into the building through said intake port, a sensor located proximal to said intake port for monitoring the concentration of pollutants in said air, a regulator for controlling the quantity of air drawn into the building, and a controller coupled to said sensor and said regulator for directing said regulator to reduce the quantity of air drawn into the building in response to the rate at which said concentration of pollutants indicated by said sensor changes, whereby the quality of air inside the building is substantially controlled.

2. The air system of claim 1 wherein said sensor monitors the concentration of carbon dioxide in said air.

3. The air system of claim 1 wherein said sensor monitors the concentration of pollutants in said air by sensing the concentration of pollutants comprising fossil fuel combustion by-products in said air, and said controller responds by modulating said regulator to reduce the influx of said pollutants into the building.

4. The air system of claim 3 wherein said controller responds when said rate at which the concentration of said pollutants changes is above a predetermined threshold.

5. The air system of claim 1 wherein said sensor monitors the concentration of carbon monoxide relative to carbon dioxide in said air, and said controller reduces the quantity of air drawn into the building in response to the rate of change of said relative concentration.

6. The air system of claim 1 wherein said sensor monitors the concentration of nitrogen oxides ($NO_x$), and said controller reduces the quantity of air drawn into the building in response to the rate of change of said concentration of nitrogen oxides ($NO_x$).

7. The air system of claim 1 wherein said regulator comprises a damper for controlling the quantity of air drawn into the building by selectively blocking said air from being drawn through said intake port.

8. An air system for controlling the quantity of outside air drawn into a building comprising an intake port for coupling said air system to a source of said air, said air being drawn into the building through said intake port, a sensor located proximal to said intake port for monitoring the concentration of carbon dioxide in said air, a regulator for controlling the quantity of air drawn into the building, and a controller coupled to said sensor and said regulator for directing said regulator to reduce the quantity of air drawn into the building in response to said concentration of carbon dioxide indicated by said sensor, whereby the quality of air inside the building is substantially controlled.

9. The air system of claim 8 wherein said controller responds when said concentration of carbon dioxide is greater than a predetermined threshold.

10. The air system of claim 8 wherein said regulator comprises a damper, and said controller triggers the reduction of air drawn into the building by modulating said damper to selectively block said air when the carbon dioxide concentration in said air is greater than a predetermined threshold.

11. A method of controlling the quantity of outside air drawn into a building comprising the steps of sensing the concentration of pollutants in said air, determining when said air quality is poor based upon the rate of change of said concentration of pollutants, and responding when said air quality is poor by reducing the quantity of said air drawn into the building, whereby the quality of air inside the building is sub- 12. The method of claim 11 wherein
said step of sensing comprises monitoring the concentration of gas-phase fossil fuel combustion by-products in said air.

13. The method of claim 12 wherein said step of sensing comprising monitoring the concentration of at least one gas-phase fossil fuel combustion by-product from the group consisting of carbon monoxide and nitrogen oxides ($NO_x$).

14. A method of controlling the quantity of outside air drawn into a building comprising the steps of sensing the quality of said air by monitoring the concentration of carbon dioxide in said air, determining when said air quality is poor as a function of said concentration of carbon dioxide, and responding when said air quality is poor by reducing the quantity of said air drawn into the building, whereby the quality of air inside the building is substantially controlled.

15. The method of claim 14 wherein determining said air quality is poor when said concentration of carbon dioxide is greater than a predetermined threshold.

16. The method of claim 14 wherein determining said air quality is poor when the rate of change of said concentration of carbon dioxide is greater than a predetermined threshold.

* * * * *